United States Patent
Zhong et al.

(10) Patent No.: US 11,580,210 B2
(45) Date of Patent: Feb. 14, 2023

(54) PASSWORD AUTHENTICATION

(71) Applicant: International Business Machines Corporation, Armonk, NY (US)

(72) Inventors: Jia Tian Zhong, Beijing (CN); Xing Xing Shen, Beijing (CN); Peng Hui Jiang, Beijing (CN); Dong Hui Liu, Beijing (CN); Yong Yin, Beijing (CN); Jia Yu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 102 days.

(21) Appl. No.: 17/178,329

(22) Filed: Feb. 18, 2021

(65) Prior Publication Data
US 2022/0261470 A1  Aug. 18, 2022

(51) Int. Cl.
*G06F 21/36* (2013.01)
*G06F 21/71* (2013.01)
*G06F 21/60* (2013.01)
*G06F 21/46* (2013.01)

(52) U.S. Cl.
CPC ............. *G06F 21/36* (2013.01); *G06F 21/46* (2013.01); *G06F 21/604* (2013.01); *G06F 21/71* (2013.01)

(58) Field of Classification Search
None
See application file for complete search history.

(56) References Cited

U.S. PATENT DOCUMENTS

| | | | |
|---|---|---|---|
| 6,434,702 B1 * | 8/2002 | Maddalozzo, Jr. ..... | G06F 21/83 726/19 |
| 7,849,321 B2 * | 12/2010 | Mizrah ................... | G06F 21/83 713/168 |
| 8,555,357 B1 * | 10/2013 | Gauvin ............... | H04L 63/1441 726/6 |
| 9,191,386 B1 * | 11/2015 | Yaron ................... | H04L 9/3228 |
| 9,275,214 B2 * | 3/2016 | Gargaro ................. | G06F 21/36 |
| 9,780,950 B1 * | 10/2017 | Dundas ............... | H04L 63/0838 |

(Continued)

FOREIGN PATENT DOCUMENTS

EP   1964078 B1   10/2012

OTHER PUBLICATIONS

Awang et al., "A Pattern-Based Password Authentication Scheme for Minimizing Shoulder Surfing Attack", International Journal on Advanced Science, Engineering and Information Technology, vol. 7 (2017), No. 3, ISSN: 2088-5334, Jun. 2017, 7 Pages.

*Primary Examiner* — James R Turchen
(74) *Attorney, Agent, or Firm* — Stephanie L. Carusillo

(57) ABSTRACT

Embodiments of the present invention relate to password authentication. According to an embodiment of the present invention, a password associated with a user identification is received from a user device. The password is authenticated based on a preset relationship between a seed password and a graphical password associated with the user identification. The seed password consists of a string of characters. The graphical password is a directed path traversing all keys of a keypad in an order. Each of the keys represents one of the characters and is associated with an order number according to the order of the keys being traversed. The preset relationship is that the password consists of respective order numbers associated with respective keys representing corresponding characters of the seed password.

20 Claims, 8 Drawing Sheets

(56) References Cited

U.S. PATENT DOCUMENTS

| | | | |
|---|---|---|---|
| 10,229,399 B2 * | 3/2019 | Urban | G06Q 20/3276 |
| 2010/0242104 A1 * | 9/2010 | Wankmueller | G06F 21/36 |
| | | | 726/9 |
| 2015/0154414 A1 * | 6/2015 | Pike | G06F 21/62 |
| | | | 726/30 |
| 2021/0112407 A1 * | 4/2021 | Shin | H04W 12/069 |

* cited by examiner

600

```
RECEIVE A PASSWORD ASSOCIATED WITH A USER
IDENTIFICATION FROM A USER DEVICE
                    602
```

```
AUTHENTICATE THE PASSWORD BASED ON A PRESET
RELATIONSHIP BETWEEN A SEED PASSWORD AND A
GRAPHICAL PASSWORD ASSOCIATED WITH THE USER
IDENTIFICATION
                    604
```

FIG. 6

PASSWORD AUTHENTICATION

BACKGROUND

The present invention generally relates to security and more specifically, relates to password authentication.

Password authentication is a process of verification in which a user is involved to input a user identification and a password that are then checked against stored credentials within a computing system. The most common password-based authentication method used by the user is via textual-based password. Nevertheless, the textual password tends to be susceptible to shoulder surfing attack as the password may be peeped by other people or by a hidden camera nearby. The other method for authentication is via graphical-based passwords. Similarly, it also suffers from shoulder surfing attack. For example, malware or insecure equipment may be installed on a device used by the user, and keystrokes or other user actions on the device may be traced by a hacker. Therefore, there is an increasing need for a secure authentication mechanism.

SUMMARY

Embodiments of the present invention disclose methods, systems, and computer program products for password authentication. According to an embodiment of the present invention, a processing unit receives a password associated with a user identification from a user device. A processing unit authenticates the password based on a preset relationship between a seed password and a graphical password associated with the user identification. The seed password consists of a string of characters. The graphical password is a directed path traversing all keys of a keypad in an order. Each of the keys represents one of the characters and is associated with an order number according to the order of the keys being traversed. The preset relationship is that the password consists of, in order, respective order numbers associated with respective keys representing corresponding characters of the seed password.

It is to be understood that the Summary is not intended to identify key or essential features of embodiments of the present invention, nor is it intended to be used to limit the scope of the present invention. Other features of the present invention will become easily comprehensible through the description below.

BRIEF DESCRIPTION OF THE DRAWINGS

Through the more detailed description of some embodiments of the present invention in the accompanying drawings, the above and other objects, features and advantages of the present invention will become more apparent, wherein the same reference generally refers to the same components in the embodiments of the present invention.

FIG. 6 depicts an example method of password authentication according to some embodiments of the present invention.

DETAILED DESCRIPTION

Figure 1:
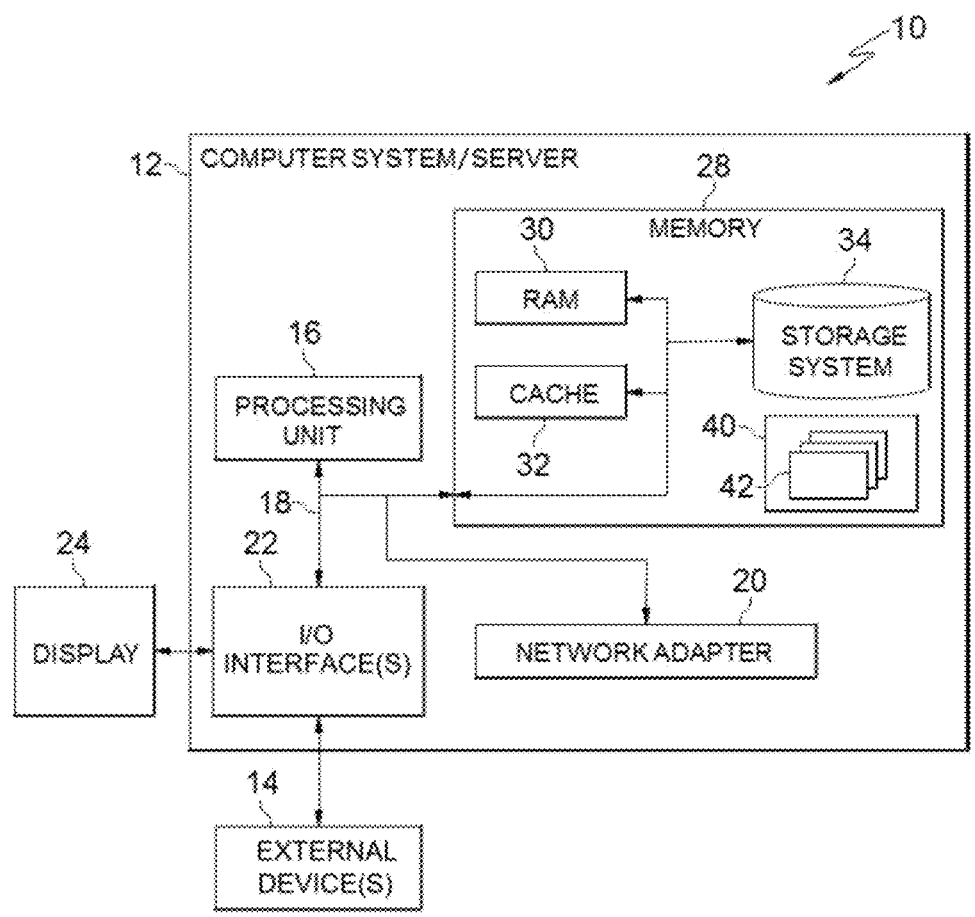
FIG. 1 depicts a cloud computing node according to some embodiments of the present invention.

Some embodiments will be described in more detail with reference to the accompanying drawings, in which the embodiments of the present invention have been illustrated. However, the present invention can be implemented in various manners, and thus should not be construed to be limited to the embodiments disclosed herein.

It is to be understood that although this invention includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
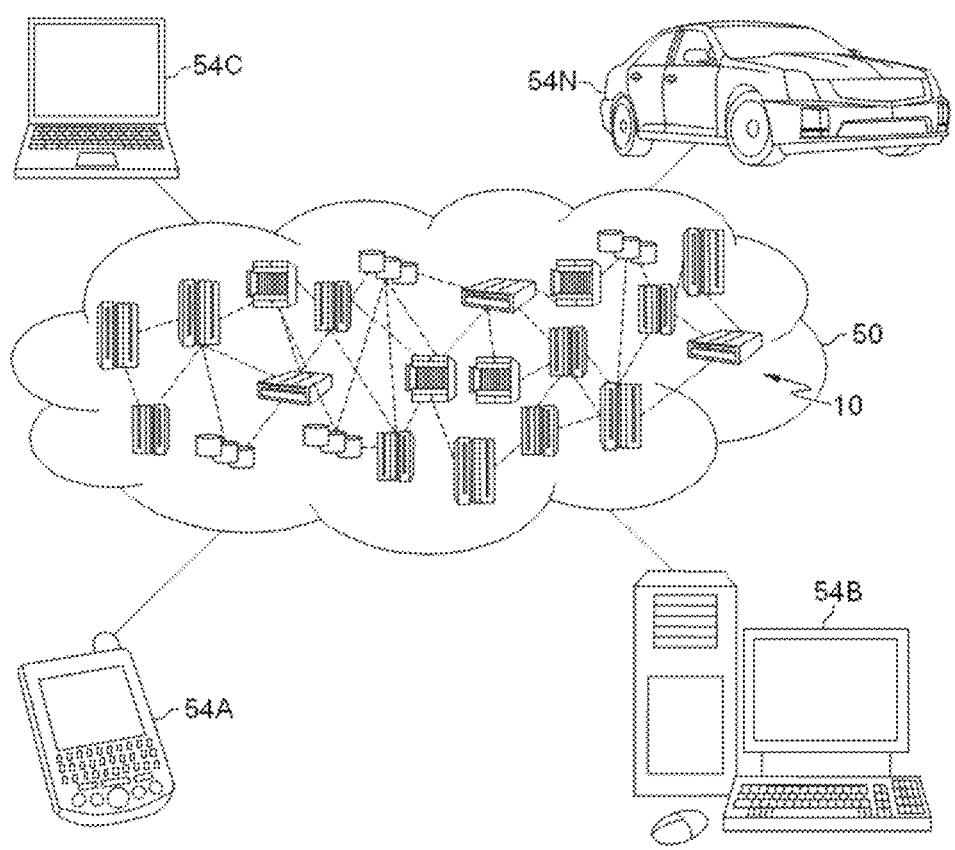
FIG. 2 depicts a cloud computing environment according to some embodiments of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
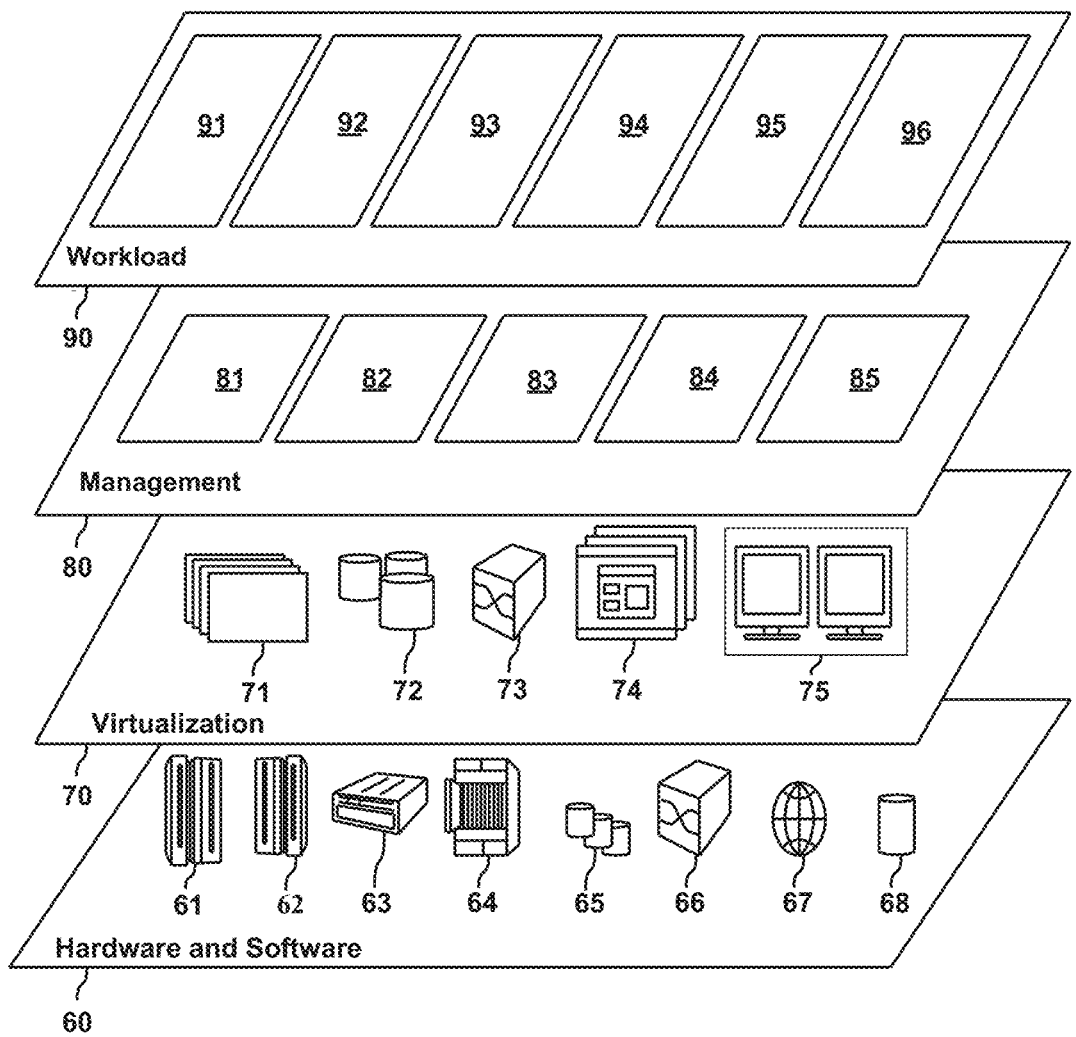
FIG. 3 depicts abstraction model layers according to some embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and alerts processing 96.

It should be noted that the alerts processing method according to embodiments of this invention could be implemented by computer system/server 12 of FIG. 1.

Shoulder surfing is an attack that can be performed by an unauthorized person to obtain confidential information of a user, such as the user's password, by watching over the user's shoulder when the user enters inputs his/her confidential information. This attack is usually effective in crowded places because it is easy for an attacker to observe someone's input actions without being suspicious.

In order to at least partially solve the above and other potential problems, embodiments of the present invention provide a new password authentication methodology that can significantly reduce the risk of shoulder surfing attack in a more efficient way. According to the embodiments of the present invention, during the login process, it is not necessary for the user to input a registered password directly, instead, the user just provides a password for authentication. Even though the input password can be peeked by the attacker, the attacker cannot use the input password to access resources of the user.

Figure 4:
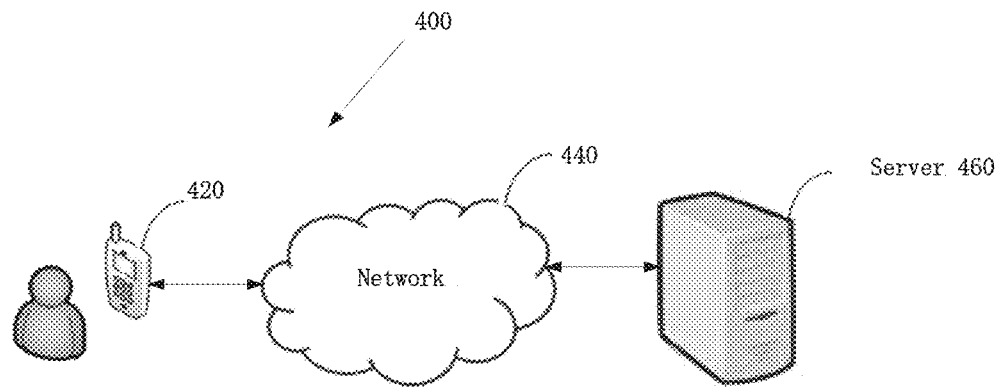
FIG. 4 depicts an example authentication system according to some embodiments of the present invention.

With reference now to FIG. 4, an example authentication system 400 according to some embodiments of the present invention is depicted. Authentication system 400 may include user device 420 as a client and server 460 as an authentication device. According to embodiments, user device 420 can communicate with server 460 via network 440. User device 420 may comprise a graphical user interface (GUI) that may allow a user to communicate with user device 420 via visual indicator representations. User device 420 can be any type of computing device, such as, a smart phone, a personal digital assistant (PDA), a cellular telephone, a tablet, a laptop computer, a desktop computer, a node in a network, a user equipment, a display device, etc. Server 460 may comprise an authentication module that can be used to authenticate a user password. For example, the authentication module can be an authentication application or service installed on server 460.

Figure 5:
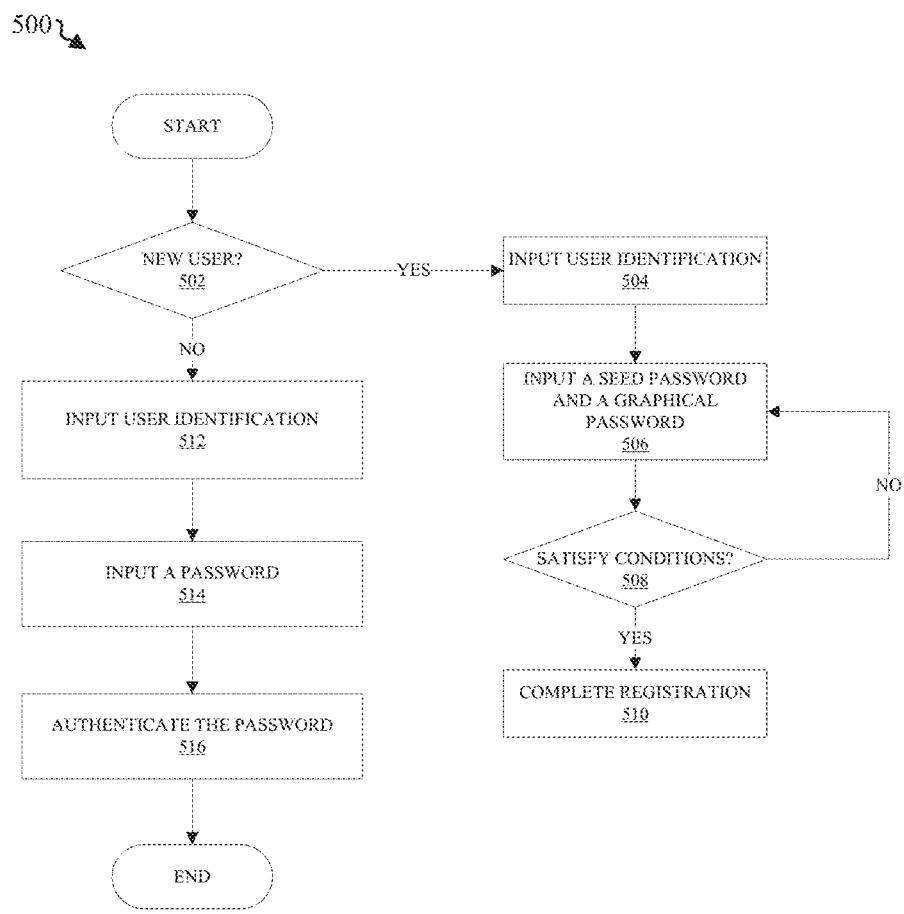
FIG. 5 depicts an example flowchart of password authentication according to some embodiments of the present invention.

With reference now to FIG. 5, an example flowchart 500 of password authentication according to some embodiments of the present invention is depicted. The flowchart 500 may be implemented by authentication system 400. The flowchart 500 may comprise steps 502-516, wherein steps 502, 504, 506, 512 and 514 can be implemented by user device 420, and steps 508, 510 and 516 can be implemented by server 460.

At decision 502, if a user is new to authentication system 400 and still has not registered, the user is required to complete a registration process. During the registration process, the user is required to input registration information to a registration page on user device 420. The registration information may include a user identification, a seed password, and a graphical password. At step 504, the user is required to input a user identification to the registration page. The user identification may be, for example, a username, an email address, a cell phone number, or any information suitable to uniquely identify the user. Then at step 506, the user is required to input a seed password and a graphical password to the registration page. In some embodiments, an input box is displayed on the registration page for the user to input the seed password. In some embodiments, a keypad is displayed on the registration page for the user to input the seed password and the graphical password. The seed password consists of a string of characters represented by keys of the keypad. The user may enter the seed password by pressing some of the keys. The user may draw a directed path traversing each key of the keypad in an order in a graphical user interface (GUI) of user device 420 with a mouse, a finger, or other input device. The directed path may form the graphical password.

At decision 508, it is determined whether the seed password and the graphical password can satisfy preset conditions. For the seed password, the preset conditions may include, for example, length requirements. For the graphical password, the preset conditions may include that the graphical password is a directed path traversing each key of the keypad in an order. If determination result is NO, the process goes back to step 506. If determination result is YES, the process proceeds to step 510 where the registration information can be registered with server 460. The registration information may be saved on a local device, a remote device, a server, a database, or any other suitable device.

Returning to decision 502, if the user is not new and has registered with server 460, the user may proceed to a login process. For the purpose of access to resources, the user is required to login to authentication system 400 by providing a user identification and a password. If the password is successfully authenticated, the user can access the resources. If the password fails to be authenticated, the user cannot access the resources.

At step 512, the user is required to input the user identification to user device 420. Then at step 514, the user is required to input the password on a keypad of user device 420. In some embodiments, the user is required to input the user identification, for example, username and the password in a login page. User device 420 is configured to provide a keypad for password authentication. In some embodiments, the respective characters displayed on the keypad may be arranged in a random way. It means that the arrangement of the respective characters may be different from time to time. The user may provide the password based on a preset relationship between a seed password and a graphical password associated with the user identification. The seed password consists of a string of characters. The graphical password is a directed path traversing all keys of a keypad in an order. Each of the keys represents one of the characters and is associated with an order number according to the order of the keys being traversed. The preset relationship is that the password consists of, in order, respective order numbers associated with respective keys representing corresponding characters of the seed password.

At step 516, upon receiving the user identification and the password from user device 420, server 460 may authenticate the password. At first, server 460 may retrieve the registered seed password and the registered graphical password associated with the user identification. Then, server 460 may generate a second password based on the preset relationship between the registered seed password and the registered graphical password. If the received password matches with the second password, it can be determined that the received password is successfully authenticated. Or else, it can be determined that authentication of the password is failed.

FIG. 6 depicts an example method of password authentication according to some embodiments of the present invention. The method 600 can be performed by server 460. The method 600 may comprise steps 602-604, which are implemented in a login process.

At step 602, server 460 may receive a password associated with a user identification from a user device. At step 604, server 460 may authenticate the password based on a preset relationship between a seed password and a graphical password associated with the user identification. The seed password consists of a string of characters. The graphical password is a directed path traversing all keys of a keypad in an order. Each of the keys represents one of the characters and is associated with an order number according to the order of the keys being traversed. The preset relationship is that the password consists of, in order, respective order numbers associated with respective keys representing corresponding characters of the seed password.

In some embodiments, the user identification, seed password, and the graphical password are included in registration information entered during a registration process.

In some embodiments, at step 604, server 460 may determine whether the password entered satisfies the preset relationship between the seed password and the graphical password. If the password satisfies the preset relationship, server 460 may determine that the password is successfully authenticated.

In some embodiments, server 460 may generate a second password based on the preset relationship between the seed password and the graphical password. Then, server 460 may compare the received password with the second password. If the received password matches with the second password, server 460 may determine that the password satisfies the preset relationship.

Figure 7A:
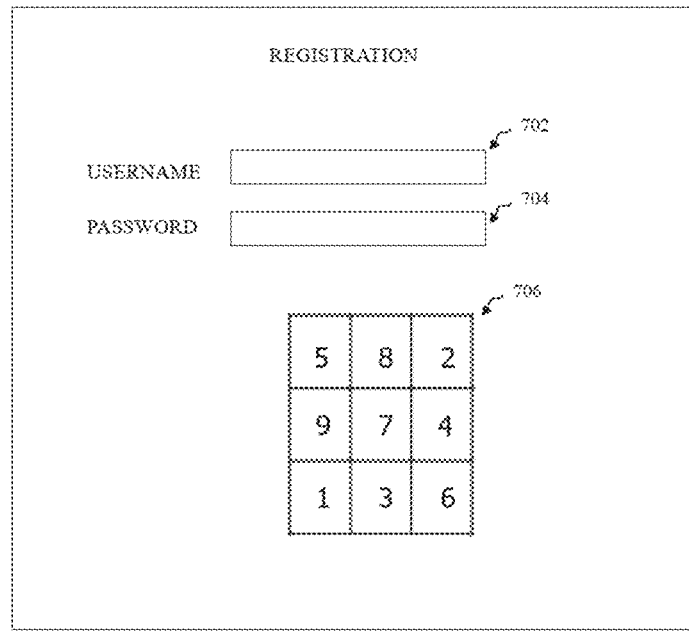
FIG. 7A-7B depict an example registration page according to some embodiments of the present invention.
Figure 7B:
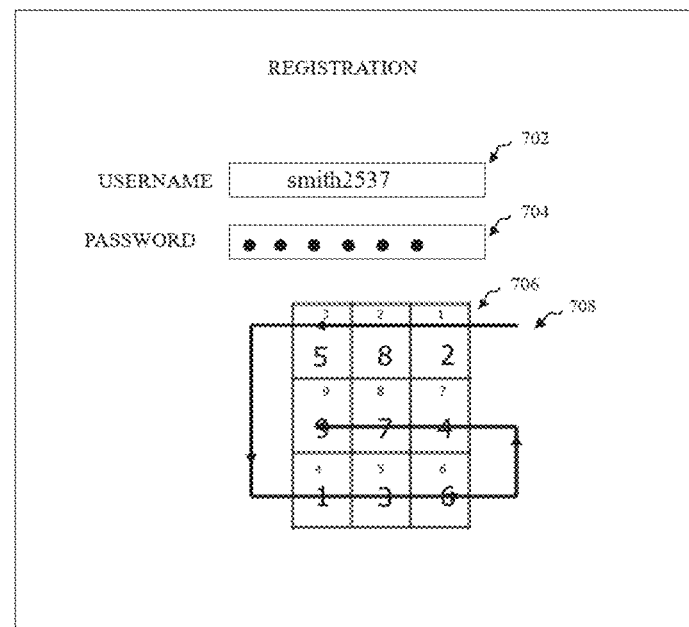

With reference now to FIGS. 7A-7B, an example registration page is depicted according to some embodiments of the present invention. The example registration page is only for a user without registration, i.e., a new user. The example registration page includes a username input box 702, a seed password input box 704, and a keypad 706. Username input box 702 is displayed for user to input a username. Seed password input box 704 is displayed for the user to input a seed password. Keypad 706 with nine keys is displayed for the user to provide a graphical password. In some embodiments, as shown in FIG. 7B, the user enters "smith2537" in username input box 702 and "834621" in seed password input box 704. Then, the user draws a directed path 708 traversing all nine keys of keypad 706 in an order. The order can be expressed as a series of order numbers 1→2→3→4→5→6→7→8→9. The graphical password can be represented as directed path 708. Each of the nine keys represents one of the characters and is associated with an order number according to the order of the nine keys being traversed. For example, a key with character "2" is associated with order number "1" and a key with character "4" is associated with order number "7". As can be seen, the drawn directed path traverses all keys of keypad 706 in an order, so that the preset conditions of the graphical password can be satisfied. It is assumed that seed password "834621" can satisfy the preset conditions of the seed password. Therefore, the input registration information can be registered with server 460.

Figure 8A:
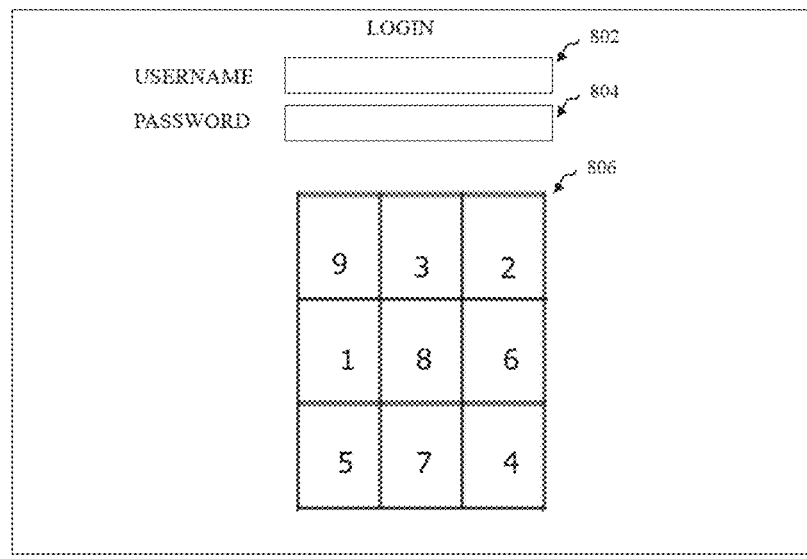
FIG. 8A depict an example login page according to some embodiments of the present invention.
Figure 8B:
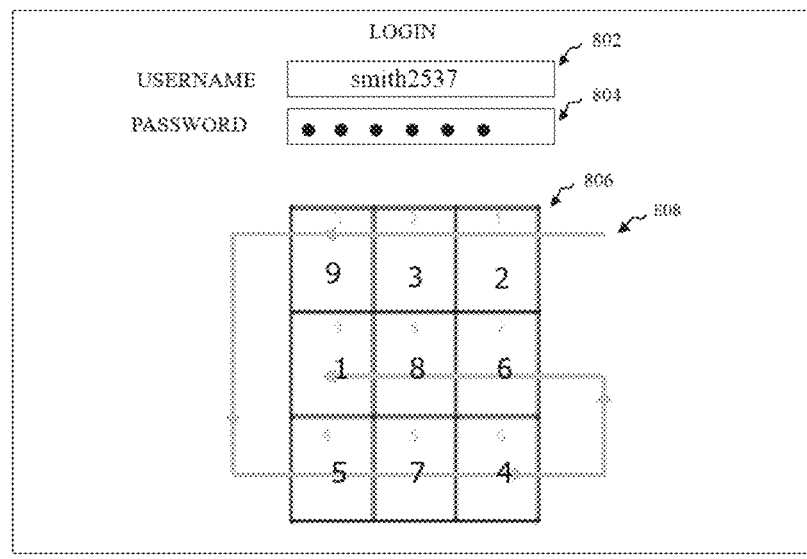
FIG. 8B depict an example login page in which password generation is shown according to some embodiments of the present invention.

With reference now to FIG. 8A, an example login page is depicted according to some embodiments of the present invention. The example login page may include a username input box 802, a password input box 804, and a keypad 806. The keypad is provided for user to input a password. FIG. 8B depicts an example login page in which a password generation process is shown according to some embodiments of the present invention. The user can determine a password based on a preset relationship between a seed password and a graphical password associated with a user identification. The seed password, the graphical password, and the user identification are entered by the user during a registration process. During a login process, the seed password and the graphical password can be recalled in the user's mind. At first, the user is required to locate a key representing a character of the seed password, that is, a key on which a character of the seed password is displayed. Then, the user is required to further determine an order number associated with the key representing the character of the seed password. In this way, respective keys representing respective characters of the seed password can be located and respective order numbers associated with the respective keys can be determined. Finally, the user can determine that the password consists of, in order, respective order numbers associated with respective keys representing corresponding characters of the seed password.

As depicted in FIG. 8B, by way of example, for the purpose of easy understanding, the graphical password represented by a directed path traversing nine keys in an order is shown on the keypad. The order is indicated as order numbers 1-9. As shown, each of the nine kyes is associated with an order number. Actually, the graphical password and the order numbers 1-9 would not be displayed on the keypad but is shown for reference. For the seed password "834621", an order number associated with a key representing a character "8" is "8", an order number associated with a key representing a character "3" is "2", an order number associated with a key representing a character "4" is "6", an order number associated with a key representing a character "6" is "7", an order number associated with a key representing a character "2" is "1", and an order number associated with a key representing a character "1" is "9". Therefore, the user can determine the password as "826719", which comprises, in an order, respective order numbers associated with respective keys representing corresponding characters of the seed password "834621". Then, the user can input username "smith2537" to username input box 802 and "826719" to password input box 804.

Upon receiving the username and the password from user device 420, server 460 can determine whether the password satisfies the preset relationship between a registered seed password and a registered graphical password associated with the username "smith2537". In some embodiments, server 460 may retrieve the seed password "834621" and the graphical password represented as a directed path 808 associated with username "smith2537". Server 460 may generate a second password based on the preset relationship between the seed password "834621" and the graphical password represented as a directed path 808. In this example, according to the preset relationship, server 460 may generate the second password "826719". After comparing the received password with the second password, server 460 can determine that the received password matches with the second password. Therefore, server 460 can determine the received password "826719" is successfully authenticated.

In some embodiments, since the respective characters displayed on the keypad may be arranged in a random way, the password may be different every time. Even if the password is peeked by an attacker, the attacker cannot get the seed password and the graphical password. Therefore, the risk of shoulder surfing attack can be effectively reduced.

In some embodiments, some people find it difficult to provide correct password without any hints. Under this circumstance, in some embodiments of the present invention, hints can be provided to the user for generating a password. During the registration process, the registration information may further include answers to questions. These answers to the questions can be registered with server 460 together with other registration information. During the login process, the user may request server 460 to provide hints for generating a password via user device 420. As a response, questions can be displayed on the login page for the user to input answers. Upon receiving inputs to the questions from user device 420, server 460 can verify whether the received inputs match with the registered answers. If the received inputs match with the registered answers, server 460 can determine that the received inputs are successfully authenticated. According to an embodiment, if the received inputs can be successfully authenticated, at least one part of the graphical password can be displayed on the keypad.

Figure 9A:
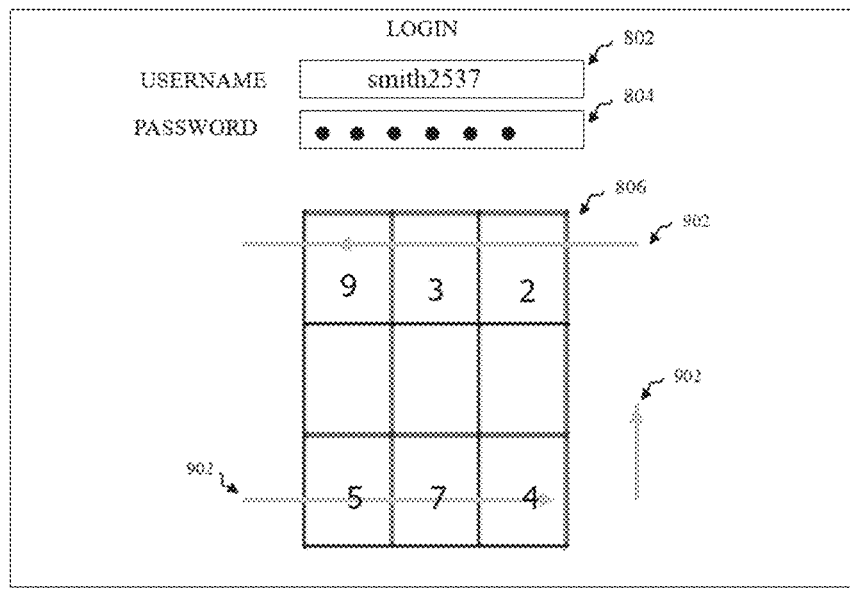
FIG. 9A depicts an example login page on which at least one part of the graphical password is displayed according to some embodiments of the present invention.
Figure 9B:
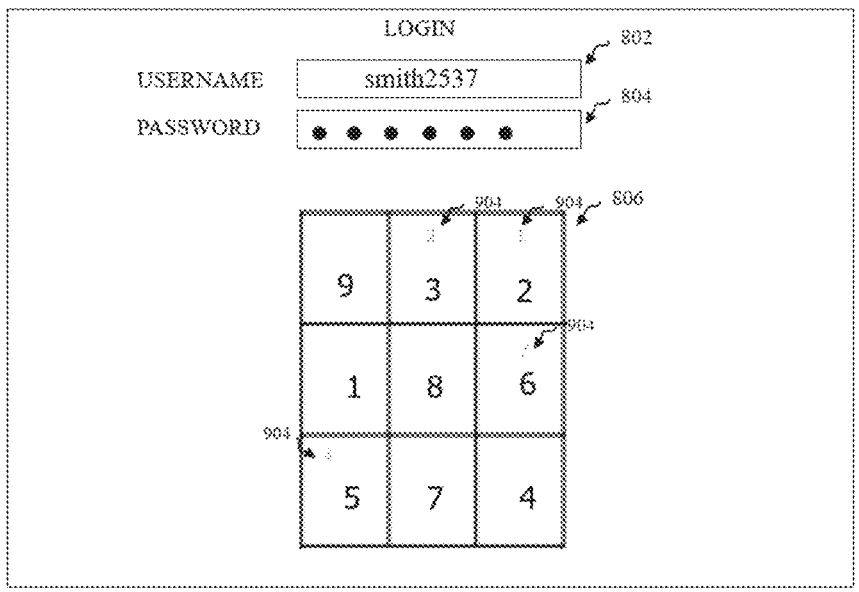
FIG. 9B depicts an example login page on which at least one sequence number is displayed according to some embodiments of the present invention.

FIG. 9A depicts an example login page on which at least one part of the graphical password is displayed according to some embodiments of the present invention. As shown, a part of the graphical password referred to as 902 is displayed on the login page as hints. The at least one part of the graphical password can help the user to recall the whole graphical password. In some embodiments, if the received answers can be successfully authenticated, at least one order number can be displayed on the keypad. FIG. 9B depicts an example login page on which at least one order number is displayed according to some embodiments of the present invention. As shown, order numbers 1, 2, 4, and 7 referred to as 904 are displayed on the associated keys as hints. The at least one order number can help the user provide the password in an easier way. To avoid shoulder surfing attack, it is not suggested to provide the whole graphical password or all the order numbers as hints.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wire transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for password authentication comprising:

receiving, by one or more processing units, a password associated with a user identification from a user device; and authenticating, by the one or more processing units, the password based on a preset relationship between a seed password and a graphical password associated with the user identification, wherein the seed password consists of a string of characters and the graphical password is a user-drawn directed path traversing all keys of a keypad in an order, wherein each of the keys represents one of the characters and is associated with an order number according to the order of the keys being traversed in the directed path, and wherein the preset relationship is that the password consists of respective order numbers associated with respective keys representing corresponding characters of the seed password.

2. The computer-implemented method of claim 1, wherein the user identification, the seed password, and the graphical password are included in registration information entered during a registration process.

3. The computer-implemented method of claim 1, wherein the authenticating comprises:

determining, by the one or more processing units, whether the password complies with the preset relationship; and in response to the password complying with the preset relationship, determining, by the one or more processing units, that the password is successfully authenticated.

4. The computer-implemented method of claim 3, wherein the determining whether the password complies with the preset relationship comprises:

generating, by the one or more processing units, a second password based on the seed password and the graphical password according to the preset relationship;

comparing, by the one or more processing units, the received password with the second password; and in response to the received password matching with the second password, determining, by the one or more processing units, that the received password complies with the preset relationship.

5. The computer-implemented method of claim 2, wherein the registration information further comprises answers to questions.

6. The computer-implemented method of claim 5, further comprising:

in response to receiving a request of providing hints of the password during the login process, displaying, by the one or more processing units, the questions on the user device; and receiving, by the one or more processing units, inputs to the questions from the user device.

7. The computer-implemented method of claim 6, further comprising:

in response to the inputs matching with the answers included in the registration information, displaying, by the one or more processing units, at least one part of the graphic password on the keypad of the user device.

8. The computer-implemented method of claim 6, further comprising:

in response to the inputs matching with the answers included in the registration information, displaying, by the one or more processing units, at least one order number on at least one associated key of the keypad.

9. A computer system for password authentication comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

receiving a password associated with a user identification from a user device; and authenticating, by the one or more processing units, the password based on a preset relationship between a seed password and a graphical password associated with the user identification, wherein the seed password consists of a string of characters and the graphical password is a user-drawn directed path traversing all keys of a keypad in an order, wherein each of the keys represents one of the characters and is associated with an order number according to the order of the keys being traversed in the directed path, and wherein the preset relationship is that the password consists of respective order numbers associated with respective keys representing corresponding characters of the seed password.

10. The computer system of claim 9, wherein the user identification, seed password, and the graphical password are included in registration information entered during a registration process.

11. The computer system of claim 9, wherein the authenticating comprises:

determining whether the password complies with the preset relationship; and in response to the password complying with the preset relationship, determining that the password is successfully authenticated.

12. The computer system of claim 11, wherein the determining whether the password complies with the preset relationship comprises:

generating a second password based on the seed password and the graphical password according to the preset relationship;

comparing the received password with the second password; and in response to the received password matching with the second password, determining that the received password complies with the preset relationship.

13. The computer system of claim 10, wherein the registration information further comprises answers to questions.

14. The computer system of claim 13, the method further comprising:

in response to receiving a request of providing hints of the password during the login process, displaying the questions on the user device; and receiving inputs to the questions from the user device.

15. The computer system of claim 14, the method further comprising:

in response to the inputs matching with the answers included in the registration information, displaying at least one part of the graphic password on the keypad of the user device.

16. The computer system of claim 14, the method further comprising:

in response to the inputs matching with the answers included in the registration information, display at least one order number on at least one associated key.

17. A computer program product for password authentication comprising:

one or more computer-readable tangible storage media and program instructions stored on at least one of the one or more computer-readable tangible storage media, the program instructions executable by a processor to cause the processor to perform a method comprising:

receiving a password associated with a user identification from a user device; and authenticating, by the one or more processing units, the password based on a preset relationship between a seed password and a graphical password associated with the user identification, wherein the seed password consists of a string of characters and the graphical password is a user-drawn directed path traversing all keys of a keypad in an order, wherein each of the keys represents one of the characters and is associated with an order number according to the order of the keys being traversed in the directed path, and wherein the preset relationship is that the password consists of respective order numbers associated with respective keys representing corresponding characters of the seed password.

18. The computer program product of claim 17, wherein the user identification, seed password, and the graphical password are included in registration information entered during a registration process.

19. The computer program product of claim 17, wherein the authenticating comprises:

determining whether the password complies with the preset relationship; and in response to the password complying with the preset relationship, determining that the password is successfully authenticated.

20. The computer program product of claim 19, wherein the determining whether the password complies with the preset relationship comprises:

generating a second password based on the seed password and the graphical password according to the preset relationship;

comparing the received password with the second password; and in response to the received password matching with the second password, determining that the received password complies with the preset relationship.

* * * * *